United States Patent
Mori et al.

(10) Patent No.: US 8,479,862 B2
(45) Date of Patent: Jul. 9, 2013

(54) MOTORCYCLE EXHAUST DEVICE

(75) Inventors: Yotaro Mori, Saitama (JP); Masato Morita, Saitama (JP); Hikaru Tsukamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 254 days.

(21) Appl. No.: 13/014,305

(22) Filed: Jan. 26, 2011

(65) Prior Publication Data

US 2011/0186373 A1 Aug. 4, 2011

(30) Foreign Application Priority Data

Jan. 29, 2010 (JP) ................................. 2010-019724

(51) Int. Cl.
*B62M 7/02* (2006.01)

(52) U.S. Cl.
USPC ........................................... 180/219; 180/251

(58) Field of Classification Search
USPC ............................ 180/219, 251; 181/250, 251
See application file for complete search history.

(56) References Cited

U.S. PATENT DOCUMENTS

| | | | |
|---|---|---|---|
| 7,895,832 B2 * | 3/2011 | Gruber | 60/299 |
| 8,042,649 B2 * | 10/2011 | Inoue | 181/252 |
| 2001/0045092 A1 * | 11/2001 | Bassani | 60/313 |
| 2007/0137189 A1 * | 6/2007 | Kikuchi et al. | 60/313 |
| 2008/0251314 A1 * | 10/2008 | Mizutani | 181/251 |
| 2009/0000282 A1 * | 1/2009 | Gruber | 60/299 |
| 2009/0000862 A1 * | 1/2009 | Buell et al. | 181/212 |
| 2010/0071990 A1 * | 3/2010 | Amir et al. | 181/228 |
| 2010/0101886 A1 * | 4/2010 | Ishibe | 180/296 |
| 2012/0186892 A1 * | 7/2012 | Felsl et al. | 180/220 |
| 2012/0205191 A1 * | 8/2012 | Matsushima et al. | 181/227 |

FOREIGN PATENT DOCUMENTS

| | | |
|---|---|---|
| JP | 2005-313671 A | 11/2005 |
| JP | 2006321489 A | 11/2006 |

* cited by examiner

*Primary Examiner* — Kevin Hurley
(74) *Attorney, Agent, or Firm* — Birch, Stewart, Kolasch & Birch, LLP

(57) ABSTRACT

A branch joint is provided at the rear portion of an exhaust pipe. Second exhaust pipes with a small diameter arranged one above the other are branched at a position forward of an intersecting position P with a pivot plate. The second exhaust pipes are made to intersect the inside of the pivot plate. The gap between the pivot plate and the engine can be narrowed while ensuring a smooth exhaust. The exhaust path lengths of the second exhaust pipes are made to be offset from each other so as not to be the integral multiple of the wavelength of the exhaust sound in the operating area. This allows exhaust gases to interfere with each other in the muffler. Thus, the exhaust sound can be reduced and the muffler can be downsized. This allows for the slimming of the vehicle body without lowering the output of the engine.

19 Claims, 12 Drawing Sheets

MOTORCYCLE EXHAUST DEVICE

CROSS-REFERENCE TO RELATED APPLICATIONS

The present application claims priority under 35 USC 119 to Japanese Patent Application No. 2010-019724 filed on Jan. 29, 2010 the entire contents of which are hereby incorporated by reference.

BACKGROUND OF THE INVENTION

1. Field of the Invention

The present invention relates generally to motorcycle exhaust devices that can be reduced in body-width to be slim and in particular to a motorcycle exhaust device suitable for off-road vehicles.

2. Description of Background Art

A motorcycle is known in which an exhaust pipe extending from an exhaust port of an engine is bent, passing between a main frame and the engine and extending rearwardly, and is connected to a muffler. See, for example, Japanese Patent Laid-Open No. 2006-321489.

A motorcycle is known in which exhaust pipes extending from a single engine are arranged to bifurcate on the left and right of a vehicle at a position rearward of a shock absorber and are connected to corresponding mufflers on the left and right of a vehicle body. See, for example, Japanese Patent Laid-Open No. 2005-313671.

FIG. 13 is a lateral view illustrating a rear portion of an exhaust system in one of the conventional examples. A muffler 223 is of an inner-outer double-tube type in which an inner pipe 221 made of punching metal is disposed in the longitudinal direction of the muffler 223 and inside an outer tube exhibiting the external appearance of the muffler 223. The inner pipe 221 is connected at a front end to an exhaust pipe (not illustrated in FIG. 13) via a joint pipe 220. In addition, the inner pipe 221 is connected at a rear end to a tail pipe 280. An end cap 254 is attached to the rear end opening of the muffler 223 (the outer tube) to close it. The tail pipe 280 passes through the end cap 254 and communicates with the posterior atmosphere at a rear end opening.

The front end opening of the muffler 223 (the outer tube) is closed by a cone-shaped front cap 270. The inside of the muffler 223 (the outer tube) closed by the front cap 270 and the end cap 254 is formed as an expansion chamber. The exhaust gas inside the inner pipe 221 comes out thereof and goes into the expansion chamber 256 to expand therein. Thereafter, the expanding exhaust gas is squeezed in the tail pipe 280 and discharged into the atmosphere. In this way, exhaust sound pressure is reduced.

However, in such a case where the exhaust pipe is made to pass between the engine and the main frame as in Japanese Patent Laid-Open No. 2006-321489 mentioned above, it is conceivable that a recessed portion is provided in the main frame in order to ensure an arrangement space for the exhaust pipe. However, this leads to the increased size and weight of the entire main frame in order to ensure the rigidity of the main frame. In addition, it is conceivable that the main frame per se is shifted outwardly so as to be away from the engine to ensure a space-width. However, if so, the body-width will be increased. Therefore, it is required to reduce the body-width to make the vehicle body slim.

Making a vehicle-body slim as described above is strongly required particularly in an off-road vehicle operating in the wilderness such as an irregular terrain or the like. It is also required to sufficiently reduce exhaust sound. Consequently, the muffler is increased in size, which may hinder the slimming of the vehicle body in some cases.

On the other hand, to arrange the exhaust pipe in order to achieve the slimming of the vehicle body, it is conceivable that the exhaust pipe intersecting the main frame is partially made concave without modifying the main frame. However, it is necessary to consider the shape of the exhaust pipe additionally in order to make the flow of exhaust gas smooth.

SUMMARY AND OBJECTS OF THE INVENTION

Accordingly, it is an object of an embodiment of the present invention to enable the slimming of a vehicle body and increase the flexibility of the driving posture while ensuring a smooth exhaust and to achieve a sufficient sound-absorbing effect without increasing the size of a muffler.

To achieve the above problem, according to an embodiment of the present invention an exhaust device for a motorcycle includes a head pipe supporting a front wheel via a front fork, a main frame extending obliquely rearwardly and downwardly from the head pipe, a pair of left and right pivot plates resulting from bending a rear portion of the main frame and extending downwardly, a swing arm swingably attached at a front end to the pivot plate and supporting a rear wheel at a rear end, and an engine disposed in a space below the main frame. An exhaust pipe includes one end connected to an exhaust port of the engine and the other end side passing between a side of the engine and the main frame and extending rearwardly. A muffler is attached to an rear end of the exhaust pipe with the exhaust pipe intersecting the main frame as viewed from the side, branching into a plurality of portions at a position forward of the intersecting position, and includes a first exhaust pipe on the exhaust-upstream side of the branch portion and a plurality of second exhaust pipes located on the exhaust-downstream side of the branch portion. The second exhaust pipe has a diameter that is smaller than that of the first exhaust pipe.

According to an embodiment of the present invention, a shock absorber is installed between a rear portion of the main frame above the pivot plate and the swing arm and the plurality of second exhaust pipes arranged one above the other pass between the shock absorber and the main frame in a back and forth direction.

According to an embodiment of the present invention, the muffler is composed of an external tube and a plurality of inner pipes disposed in the external tube and respective ends of the second exhaust pipes are each connected to a corresponding one of the inner pipes.

According to an embodiment of the present invention, the inner pipes communicate with a space in the external tube through punching in the external tube and the second exhaust pipes are different from each other in the length from the branch portion to a punching-start position.

According to an embodiment of the present invention, a rear end of the external tube of the muffler is blocked by a partition wall and is covered by an end cap from the rear, an expansion chamber is defined between the partition wall and the end cap, the inner pipes communicate at downstream ends with the inside of the expansion chamber, and the end cap is provided with an exhaust port adapted to allow the expansion chamber to communicate with the outside.

According to an embodiment of the present invention, an exhaust port of the end cap and a downstream end opening of each of the inner pipes are arranged to be offset from an axial direction of each of the inner pipes.

According to an embodiment of the present invention, the second exhaust pipes are attached to the pivot plate via a support plate at a portion intersecting the pivot plate and the support plate connects the second exhaust pipes together.

According to an embodiment of the present invention, the support plate includes bending portions each bending along and welded to the outer circumference of each of the second exhaust pipes and a connecting portion connecting the bending portions together and at least partially extending between the second exhaust pipes adjacent to each other, and the support plate is bolted to the pivot plate with a nut attached to the connecting portion.

According to an embodiment of the present invention, plate-like external walls each straddle and are secured to the second exhaust pipes from the left and right to define an expansion chamber between the second exhaust pipes.

According to an embodiment of the present invention, the exhaust pipe is branched into the plurality of second exhaust pipes with a small diameter at a position forward of the position intersecting the main frame. Therefore, the gap between the main frame and the engine can be narrowed by allowing the second exhaust pipes with a small diameter to intersect the main frame.

In this way, the engine and the other auxiliaries are arranged in an essentially narrow space. However, the engine and the other auxiliaries can be arranged in the engine arrangement space surrounded by the main frame and the down tube without making the main frame concave and without outwardly displacing it for the arrangement, and without making the exhaust pipe concave.

In addition, the plurality of second exhaust pipes ensure a sufficient exhaust amount and allow for smooth exhaust. Therefore, while ensuring the power output of the engine, the slimming of the vehicle body can be enabled.

According to an embodiment of the present invention, the plurality of second exhaust pipes arranged one above the other are made to pass between the pivot plate and the shock absorber. Therefore, the gap between the pivot plate and the shock absorber can be narrowed according to the reduced diameters of the second exhaust pipes. This allows for the slimming of the vehicle body.

According to an embodiment of the present invention, the second exhaust pipes are each connected to a corresponding one of the inner pipes. The exhaust paths combining each of the second exhaust pipes with a corresponding one of the inner pipes can be made different in the exhaust path length from each other. The exhaust gases of the second exhaust pipes can go inside the outer tube with the phases of exhaust sound waveforms shifted from each other and interfere with each other to cancel each other. Thus, the exhaust sound can be reduced and the muffler can be reduced in diameter.

According to an embodiment of the present invention, the inner pipes disposed inside the external tube are made of punching metal and are different from each other in punching-start position. The difference between the start-positions is different at such a length so as to be an integral multiple of the wavelength of the exhaust sound in the normal operating area of the engine. Thus, the exhaust gases coming out of the inner pipes interfere with each other, which can reduce the exhaust sound.

According to an embodiment of the present invention, the rear end of the external tube is blocked by the partition wall where the respective rear ends of the inner pipes are opened and is covered by the end cap. The inside of the end cap is formed as an expansion chamber. The inner pipes communicate with the inside of the expansion chamber. In this way, the exhaust sound can be reduced in the expansion chamber.

Therefore, it is needed only to provide an opening for the exhaust port in the end cap. Exhaust gas can be discharged from the expansion chamber directly through the exhaust port, but not via the conventional tail pipe. Thus, the tail pipe serving as the conventional restrictor can be omitted, which makes for a satisfactory escaping flow of exhaust gas toward the atmosphere.

According to an embodiment of the present invention, the opening of the end cap and the openings of the rear ends of the inner pipes are arranged to be offset from each other. The exhaust gas coming out of the rear ends of the inner pipes once hits the inner wall of the end cap and then is discharged. This reduces the fact that the exhaust gas coming out of the respective rear ends of the inner pipes is directly discharged from the exhaust port of the end cap. Therefore, the expansion chamber can efficiently be utilized to enhance a sound-absorbing effect.

According to an embodiment of the present invention, the second exhaust pipes are connected to each other by the support plate and are attached to the pivot plate using the support plate. Therefore, the support plate can be made to have multiple functions.

According to an embodiment of the present invention, the support plate includes the bending portions each bending along and welded to the outer circumference of each of the second exhaust pipes and the connecting portion connecting the bending portions together and at least partially extending between the second exhaust pipes adjacent to each other, and the support plate is bolted to the pivot plate with a nut attached to the connecting portion. Therefore, the pivot plate can be brought closer to the second exhaust pipes, contributing to the slimming of the vehicle body.

According to an embodiment of the present invention, the space defined between the second exhaust pipes is used to provide the expansion chamber therein. Therefore, the expansion chamber can be used as a resonator, which can vary the output characteristics of the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
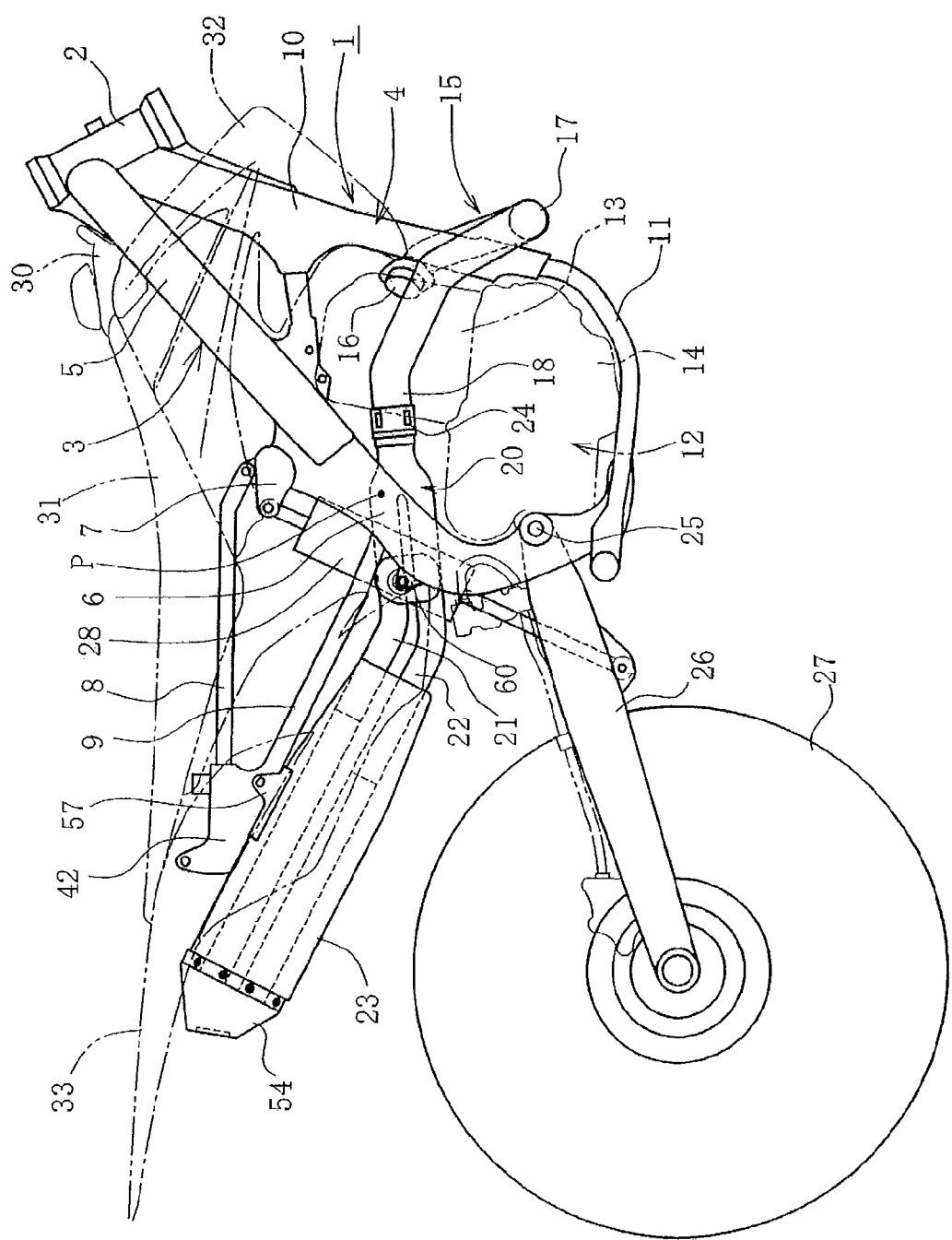
FIG. 1 is a lateral view of a vehicle body of a motorcycle according to an embodiment with a front wheel side partially omitted.

An embodiment will hereinafter be described with reference to the drawings. In the following description, directions such as front and rear, upside and downside, and left and right are based on the upright state of a vehicle. FIG. 1 illustrates a lateral surface of a vehicle body of an off-road motorcycle with a front wheel side partially omitted. In FIG. 1, a body frame 1 includes a head pipe 2 installed at a front end; main frames 3 extending obliquely downwardly and rearwardly from the head pipe 2; and a down tube 4 extending, below the main frame 3, obliquely downwardly at an acuter angle and rearward from the head pipe 2. The main frames 3 each includes a main portion 5, i.e., a front half portion, extending substantially linearly; and a pivot plate 6 bending from the rear end portion of the main portion 5 and extending downwardly. A cross member 7 is provided at an upper end of the pivot plate 6. Seat rails 8 extend rearwardly from the cross member 7. A rear stay 9 is spanned between a rear end of the seat rail 8 and an intermediate portion of the pivot plate 6.

The down tube 4 includes a down portion 10, i.e., an upper portion, extending substantially linearly; and a lower frame 11 bending from the lower end of the down portion 10, extending rearwardly, and connecting at a rear end with the lower end of the pivot plate 6. The main frame 3 and the down tube 4 form a closed loop as viewed from the side. An engine 12 is disposed and supported in the closed space.

The engine 12 includes a cylinder 13 and a crankcase 14. A front end 16 of an exhaust pipe 15 is joined to an exhaust port, not illustrated in FIG. 1, provided at the front surface of the cylinder 13. Although being not clearly illustrated in FIG. 1, the down portion 10 is provided as a single one extending along the center of the vehicle body. The exhaust pipe 15 extends on the left of the down portion 10 from the exhaust port forwardly and obliquely downwardly, forming a bent portion 17 in front of the down portion 10, and extends around the right of the down portion 10. Then, the exhaust pipe 15 extends obliquely upwardly and rearwardly and intersects the side of the cylinder 13.

A rear portion 18 of the exhaust pipe 15 overlapping the side of the cylinder 13 is branched and connected to two second exhaust pipes 21, 22 via a branch joint 20 between the pivot plate 6 and the cylinder 13.

In addition, the second exhaust pipes 21, 22 are a portion on the rear (exhaust-downstream) side of the branch portion of the joint 20. The first exhaust pipe relative to the second exhaust pipes corresponds to the exhaust pipe 15 (the rear portion 18) on the exhaust-upstream side of the branch portion. The second exhaust pipes 21, 22 are made vertically parallel to each other, intersecting the inside of the pivot plate 6, extending rearwardly, and connect with a muffler 23. The second exhaust pipe 22 is disposed generally parallel to and below the rear stay 9 and on one side (the right side) of the vehicle body and is supported by the rear stay 9.

The rear portion 18 of the exhaust pipe 15 and a joining portion 24 of the branch joint 20 are located forward of the pivot plate 6. Exhaust gas is split into two portions while flowing from the joining portion 24 into the branch joint 20. In other words, the exhaust gas is split at a position forward of an intersecting portion P between the second exhaust pipes 21, 22 and the pivot plate 6. With this, the second exhaust pipes 21, 22 are reduced in diameter; therefore, the pivot plate 6 can be disposed more inward of the vehicle body, which allows for the slimming of the vehicle body.

Brackets 42 are each provided at the rear end of the seat rail 8. The seat rails 8 are connected to the corresponding rear ends of the rear stays 9 via the corresponding brackets 42. The muffler 23 is mounted to the lower lateral surface of a right bracket 42 via a stay 57. In this way, the muffler 23 is supported by the seat rail 8 and the rear stay 9. The muffler 23 is disposed on one side of, i.e., on the right side of the vehicle body. In addition, also the branch joint 20, the second exhaust pipes 21, 22 and the rear portion 18 of the exhaust pipe 15 are disposed on the right side of the vehicle body.

A pivot 25 is provided at a vertically intermediate portion of the pivot plate 6 and at a position slightly below the intermediate portion. A swing arm 26 is swingably mounted to the pivot plate 6 at a front end. A rear wheel 27 is supported by the rear end of the swing arm 26. A shock absorber 28 is vertically disposed between the intermediate portion of the swing arm 26 and the cross member 7 so as to be tilted forwardly. The shock absorber 28 is disposed to intersect the most rearward bending and projecting portion of the pivot plate 6 at a position above the pivot 25 in the lateral view. The second exhaust pipes 21, 22 pass between the shock absorber 28 and the pivot plate 6 in the front and rear direction while intersecting the shock absorber 28.

A fuel tank 30 is mounted on the main portion 5. A seat 31 is mounted on the seat rails 8 rearward of the fuel tank 30. A shroud 32 covers both left and right sides of the main portion 5 and of the down portion 10. A rear fender 33 is provided.

Figure 2:
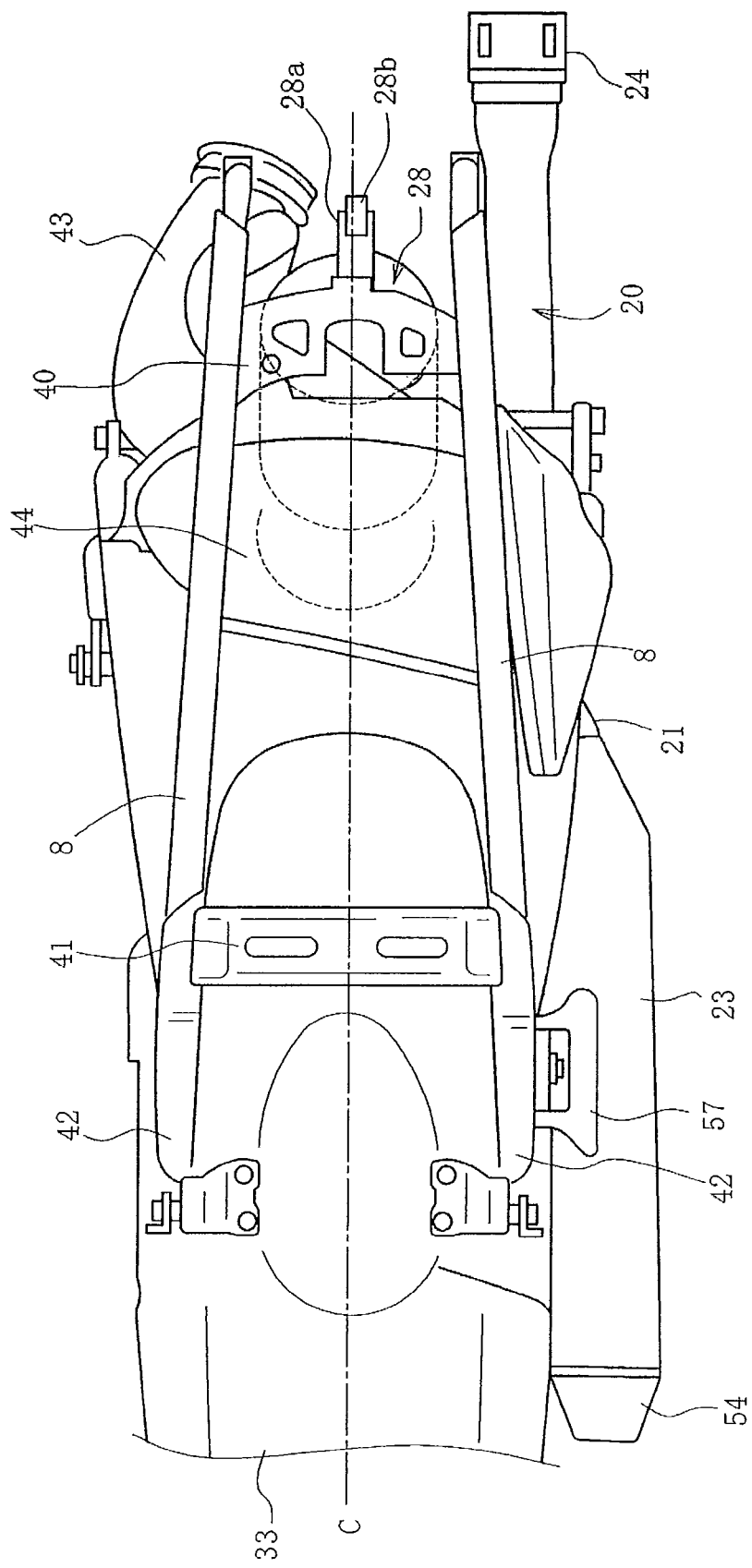
FIG. 2 is a plan view of an essential portion on the rear portion side of the vehicle body.
Figure 3:
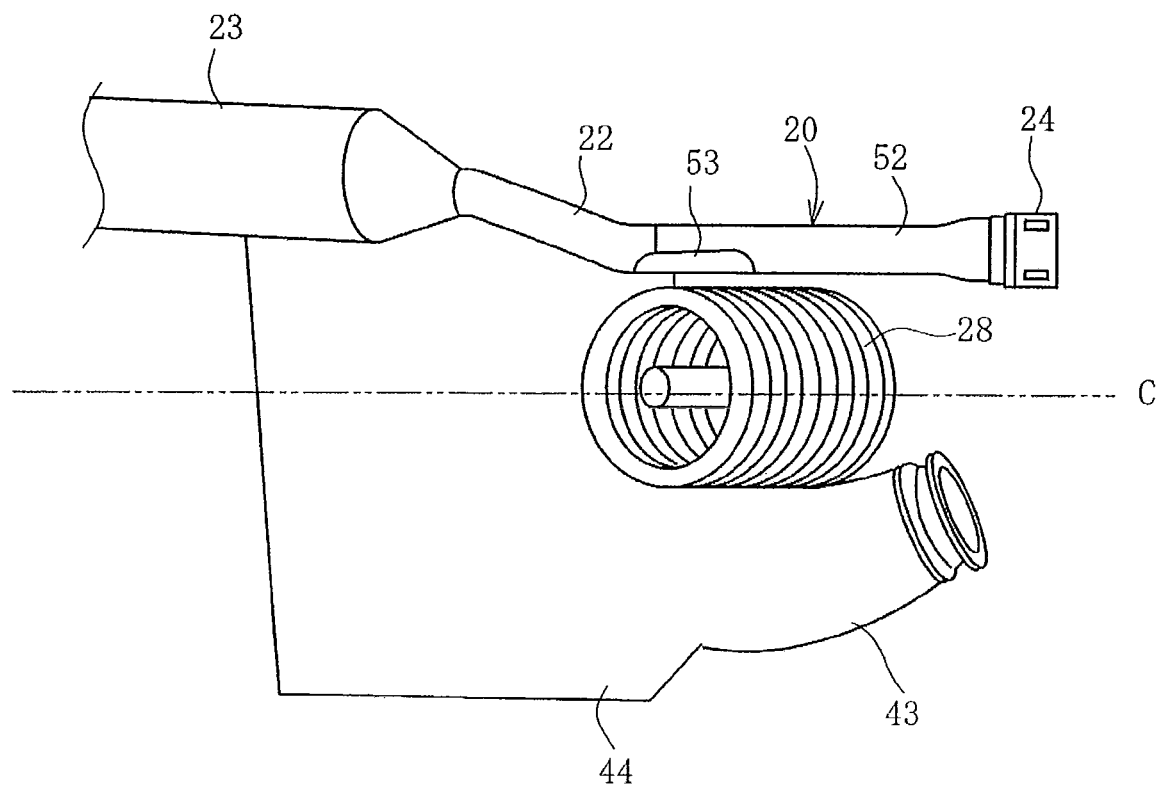
FIG. 3 is a bottom view of an essential portion of the vehicle body on the periphery of a shock absorber.

FIG. 2 is a plan view of an essential portion of the rear portion of the vehicle body. FIG. 3 is a bottom view illustrating a further essential portion extending around the shock absorber of the illustrated portion illustrated in FIG. 2. In the figures, the seat rails 8 are provided as a right and left pair. The left and right front portions and rear portions of the seat rails 8 are connected with each other via corresponding cross plates 40, 41. The brackets 42 are provided at the corresponding rear ends of the left and right seat rails 8. The muffler 23 is mounted via the stay 57 to the right bracket 42. The muffler 23, the branch joint 20 and the second exhaust pipe 21 (overlapping also the second exhaust pipe 22 from above) are disposed on one side of, i.e., on the right side of the vehicle body.

An upper portion of the shock absorber 28 is located forward of the cross plate 40 and on the vehicle body center C. The branch joint 20 and the second exhaust pipes 21, 22 located on the right side of the vehicle body and a connecting tube 43 on the left side are arranged to put the shock absorber 28 therebetween. The connecting tube 43 is bent to extend around the left side of the shock absorber 28. In addition, the connecting tube 43 is connected at a front end with an intake port (not illustrated in FIGS. 2 and 3) of the cylinder 13 and connected at a rear end with an air cleaner 44 supported between the left and right seat rails 8 rearward of the shock absorber 28.

Figure 4:
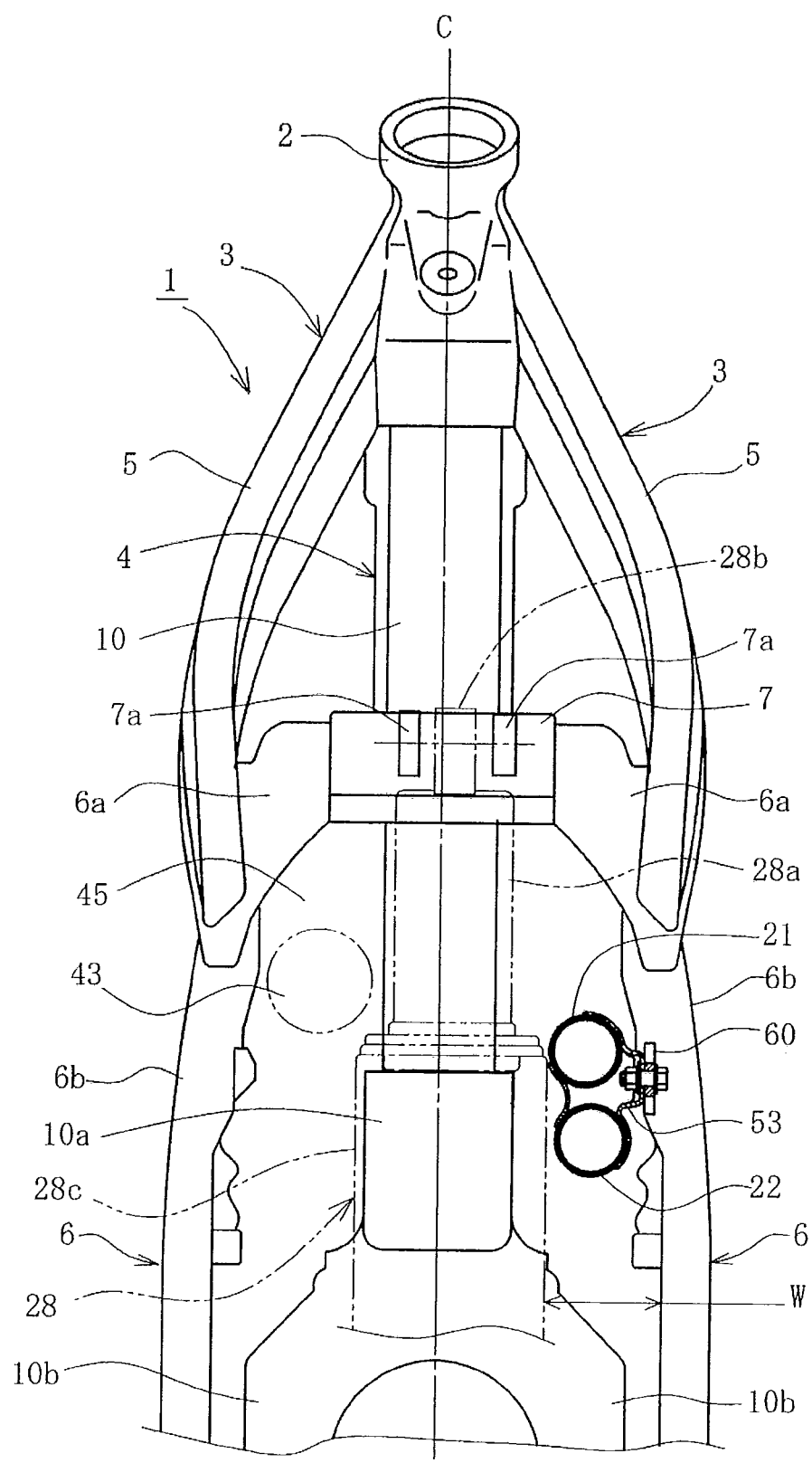
FIG. 4 illustrates a body frame as viewed from the rear.

FIG. 4 illustrates the body frame as viewed from the rear. As illustrated in FIG. 4, the head pipe 2 and the down portion 10 of the down tube 4 are provided as a single one along the vehicle body center C. In addition, the main frame 3 and the pivot plate 6 are each provided as a left and right pair. The main portions 5 of the main frames 3 are bifurcated right and left from the head pipe 2, extending rearwardly while bending, extending rearwardly, and connected with the corresponding upper portions of the pivot plates 6. In addition, although not illustrated in FIG. 4, also the seat rail 8 and the rear stay 9 are each provided as a left and right pair.

An upper portion 6a of the pivot plate 6 above a portion connecting with the rear end of the main portion 5 protrudes above and inwardly from the rear end of the main portion 5. In addition, the cross member 7 connects between the upper ends of the left and right upper portions 6a. The cross member 7 is provided with a pair of projecting cushion members 7a spaced from each other. An upper attachment cylindrical portion 28b, of the shock absorber 28, provided at an upper end of the piston rod 28a is pivotally supported by the cushion members 7a. The shock absorber 28 is disposed along the vehicle body center C so as to be tilted vertically (see FIG. 1).

The down portion 10 of the down tube 4 connects with a bracket 10a whose lower portions are formed in an inverted, general Y-shape. The lower portions 10b of the bracket 10a are formed like sloping shoulders and branched right and left. The lower frames 11 paired right and left are joined at front ends to the corresponding lower portions 10b branched right and left (see FIG. 1).

Of a space 45 surrounded by the down portion 10, the shock absorber 28, the bracket 10a, the lower portions 10b, the pivot plates 6 and the cross member 7, in a portion on the right of the vehicle body center C, the second exhaust pipes 21, 22 are disposed vertically parallel to each other. Each of the second exhaust pipes 21, 22 has a diameter slightly smaller than an interval W between the shock absorber 28 and the pivot plate 6. The shock absorber 28 includes a large-diameter portion 28c increased in size by an absorber spring and the like at a position below the upper attachment cylindrical portion 28b. The second exhaust pipes 21, 22 are located on the side of the large-diameter portion 28c. The interval W is a width between the large-diameter portion 28c and the pivot plate 6 facing thereto.

In addition, the upper second exhaust pipe 21 is located on the inside of a bending portion 6b which bends inwardly since the pivot plate 6 is joined to the rear end of the main portion 5. Therefore, the upper second exhaust pipe 21 is disposed to be offset slightly inwardly from the lower second exhaust pipe 22. Consequently, a line connecting the respective centers of the second exhaust pipes 21, 22 is such that its upper portion is tilted so as to approach the vehicle body center C.

As illustrated in FIG. 1, the shock absorber 28 disposed to be tilted forwardly intersects the main portion 5 which has a dull tilt angle relative to a horizontal line than that of the shock absorber 28. The second exhaust pipes 21, 22 intersect the shock absorber 28 so as to overlap it.

As described above, the exhaust pipe 15 is branched into the plurality of second exhaust pipes 21, 22 each having a small diameter at a position forward of an intersecting position between the exhaust pipe 15 and the pivot plate 6 which is a portion of the main frame 3. Therefore, the gap between the pivot plate 6 and the engine 12 can be narrowed by allowing the second exhaust pipes 21, 22 each having a small diameter to intersect the pivot plate 6.

In this way, the engine 12 and the other auxiliaries are arranged in an essentially narrow space. However, they can be arranged in the engine 12 surrounded by the main frame 3 and the down tube 4 without making the pivot plate 6 concave or without outwardly displacing it for the arrangement, and without making the exhaust pipe concave.

In addition, the plurality of second exhaust pipes 21, 22 ensure a sufficient exhaust amount and allow for a smooth exhaust. Therefore, while ensuring the power output of the engine, the slimming of the vehicle body can be enabled.

The plurality of second exhaust pipes 21, 22 are made vertically parallel to each other and are passed between the pivot plate 6 and the shock absorber 28. Therefore, the gap between the pivot plate 6 and the shock absorber 28 can be narrowed according to the reduced diameters of the second exhaust pipes 21, 22. This allows for the slimming of the vehicle body.

A detailed description is next given of the rear portion of the exhaust system composed of the branch joint 20, the second exhaust pipes 21, 22 and the muffler 23.

Figure 5:
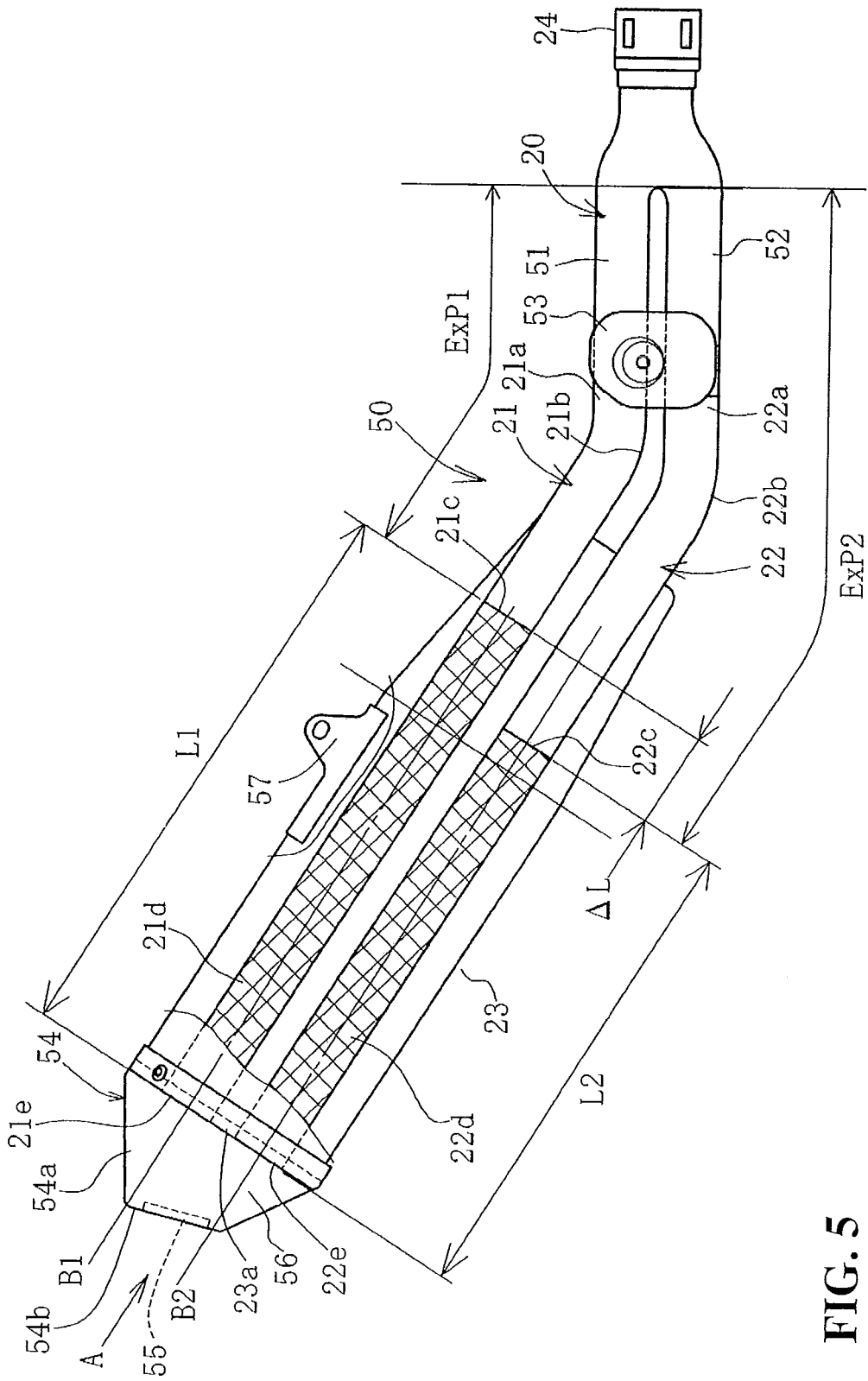
FIG. 5 is a lateral perspective view of a rear portion of an exhaust system.

FIG. 5 is a perspective lateral view of part of an exhaust system rear portion 50. In FIG. 5, the branch joint 20 is a generally a Y-shaped tubular member which integrally includes the joining portion 24 formed like a single tube as its front portion; and branch pipes 51, 52 resulting from rearward bifurcation from the joining portion 24. The branch joint 20 is formed by joining half-split press products together or manufactured by a method such as casting or the like.

The front end of a main body portion 21a forming the second exhaust pipe 21 is fitted and joined to the upper branch pipe 51. The front end of a main body portion 22a forming the second exhaust pipe 22 is fitted and joined to the lower branch pipe 52. The branch pipe 51 and the second exhaust pipe 21 are connected to the branch pipe 52 and the second exhaust pipe 22 by means of a support plate 53 so as to include a joining portion between the branch pipe 51 and the second exhaust pipe 21 and between the branch pipe 52 and the second exhaust pipe 22.

In addition, the second exhaust pipe 21 is composed of the upper branch pipe 51 and the main body portion 21a and the second exhaust pipe 22 is composed of the lower branch pipe 52 and the main body portion 22a.

The respective main body portions 21a, 22a of the second exhaust pipes 21, 22 extend vertically parallel and rearwardly with a little interval therebetween at a portion close to the joining portion between the front portion of the main body portion 21a and the branch pipe 51 and between the front portion of the main body portion 22a and the branch pipe 52. Thereafter, the main body portions 21a, 22a bend obliquely upwardly at corresponding bending portions 21b, 22b. In addition, rear portions 21c, 22c posterior to the respective bending portions 21b, 22c extend substantially parallel to each other and rearward with a gap greater than that between portions forward of the bending portions 21b, 22b.

The respective positions of the bending portions 21b, 22b are in a front and rear direction displaced from each other. Rear portions 21c, 22c which are rearward portions of the bending portions 21b, 22b have respective rear sections extending into the muffler 23 and are connected with corresponding punching portions 21d, 22d.

The muffler 23 is of an inner-outer double-tube type. A portion illustrated as an external appearance portion of the muffler 23 is formed to serve as an external tube (hereinafter, the muffler 23 is used to also mean the outer tube). In addition, the punching portions 21d, 22d serve as inner pipes.

The punching portions 21d, 22d are formed with a large number of pores, so that the inside of each of the punching portions 21d, 22d communicates with an expansion chamber 56, a space inside the muffler 23. The respective rear end portions of the punching portions 21d, 22d are formed as corresponding openings 21e, 22e, which communicate with the expansion chamber 56 inside the muffler 23.

The second exhaust pipes 21, 22 have respective starting positions of the punching portions 21d, 22d different from each other. In the embodiment, the punching portion 21d is located forward of the punching portion 22d. Consequently, the punching portions 21d, 22d have respective lengths L1, L2 different from each other (L1>L2) and the difference between the starting positions is ΔL.

The difference ΔL is set at such a distance as not to be the integral multiple of the wavelength of exhaust sound pressure in the operating area of the engine. This allows the exhaust sound from the punching portion 21d into the muffler 23 to interfere with that from the punching portion 22d. The punching starting positions are different from each other at a length according to the integral multiple of the exhaust sound wavelength in the normal operating area of the engine. Therefore, the exhaust gases discharged from the punching portions 21d, 22d which are inner pipes interfere with each other, which can reduce exhaust sound. The exhaust sound wavelength in the normal operating area of the engine is appropriately determined depending on the type, specifications, etc. of the engine.

An exhaust path length ExP1 of the second exhaust pipe 21 is a length from the front end (the bifurcate portion of the joint 20) of the branch pipe 51 to the rear end of the rear portion 21c. An exhaust path length ExP2 of the second exhaust path length 22 is a length from the front end (the bifurcate portion of the joint 20) of the branch pipe 52 to the rear end of the rear portion 22c. The respective exhaust path lengths ExP1, ExP2 (ExP1<ExP2) of the second exhaust pipes 21, 22 are different from each other. The difference corresponds to ΔL; therefore, also it is set at such a distance as not to be integral multiple of the exhaust sound wavelength in the operating area of the engine. In this way, the exhaust gases of the second exhaust pipes 21, 22 enter the expansion chamber 56 of the muffler 23 with the phases of exhaust sound waveforms shifted from each other. The exhaust gases interfere with each other to negate each other, which can reduce the exhaust sound. Thus, it is possible to downsize the muffler 23, which can achieve the slimming of the vehicle body while maintaining smooth exhaust.

An end cap 54 shaped like a generally circular truncated cone as viewed from the side is put on the rear end of the muffler 23. A front end of the end cap 54 is put on and united with, by welding, the outer circumference of the rear end of the muffler 23 which is progressively increased in diameter as it goes toward the rearward. A lateral surface 54a of the end cap 54 is formed like a slope tilted to converge on the rearward. The rear end surface 54b is formed as a flat surface parallel to the generally vertical direction and is formed with an exhaust port 55 opening at a central portion thereof.

The muffler 23 is closed by the end cap 54 to define an inner space as the expansion chamber 56, in which the exhaust gas coming out from the punching portions 21d, 22d can expand to reduce the sound pressure.

A stay 57 welded to the upper external surface of the muffler 23 is illustrated in FIG. 5. The stay 57 is connected, by means of a bolt or the like, to the bracket 42 installed between the rear ends of the seat rail 8 and the rear stay 9.

Figure 6:
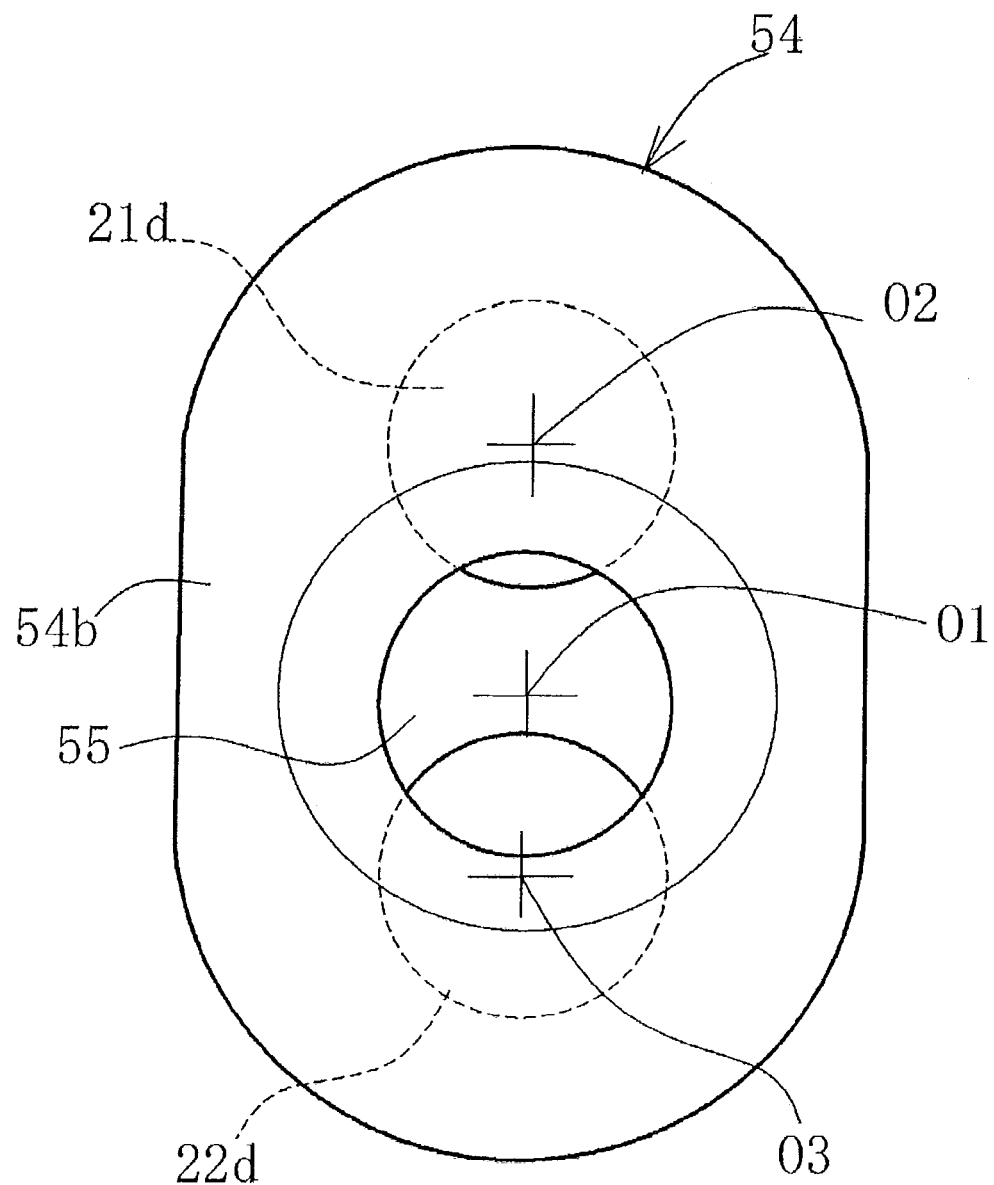
FIG. 6 illustrates an end cap as viewed from arrow A in FIG. 5.

FIG. 6 is a rear view of the end cap 54 as viewed from an arrow-A direction (the direction parallel to the respective central axes B1 and B2 of the punching portions 21d and 22d) in FIG. 5. As illustrated in FIG. 6, the respective openings 21e, 22e of the second exhaust pipes 21, 22, disposed one above the other, of the muffler are disposed to put the exhaust port 55 therebetween vertically and so as not to overlap each other. The end cap 54 has a vertically long shape like a vertically long, nearly ellipse, which suppresses the lateral width of the muffler 23, contributing to the slimming of the vehicle body.

Symbol O1 in FIG. 6 denotes the center of the exhaust port and symbols O2 and O3 denote the punching portions 21d and 22d, respectively, and are located on central axes B1 and B2, respectively. The respective centers O2, O3 of the punching portions 21d, 22d are disposed to be offset from the center of the exhaust port 55 and overlap the rear end face 54b. The major opening area of the rear end openings 21e, 22e overlap the rear end face 54b and only a portion thereof edges into the exhaust port 55. In this way, exhaust gas coming out from the rear end openings 21e, 22e mostly hit the rear end face 54b and the lateral surface 54a. This reduces the amount of exhaust gas directly passing through the exhaust port 55 from the rear end openings 21e, 22e. Thus, even if a conventional tail pipe is eliminated, the same effect as the squeeze of exhaust gas in the tail pipe can be produced in terms of a reduction in the exhaust sound.

In addition, the tail pipe does not project rearwardly and the concavity and convexity of the rear face of the end cap 54 is reduced. Even mud adhering to the front surface of the muffler 23 is likely to flow and drop down smoothly. Therefore, the exhaust port 55 becomes hard to be clogged. This is particularly advantageous to off-road vehicles to which a large amount of mud is liable to adhere.

Figure 7:
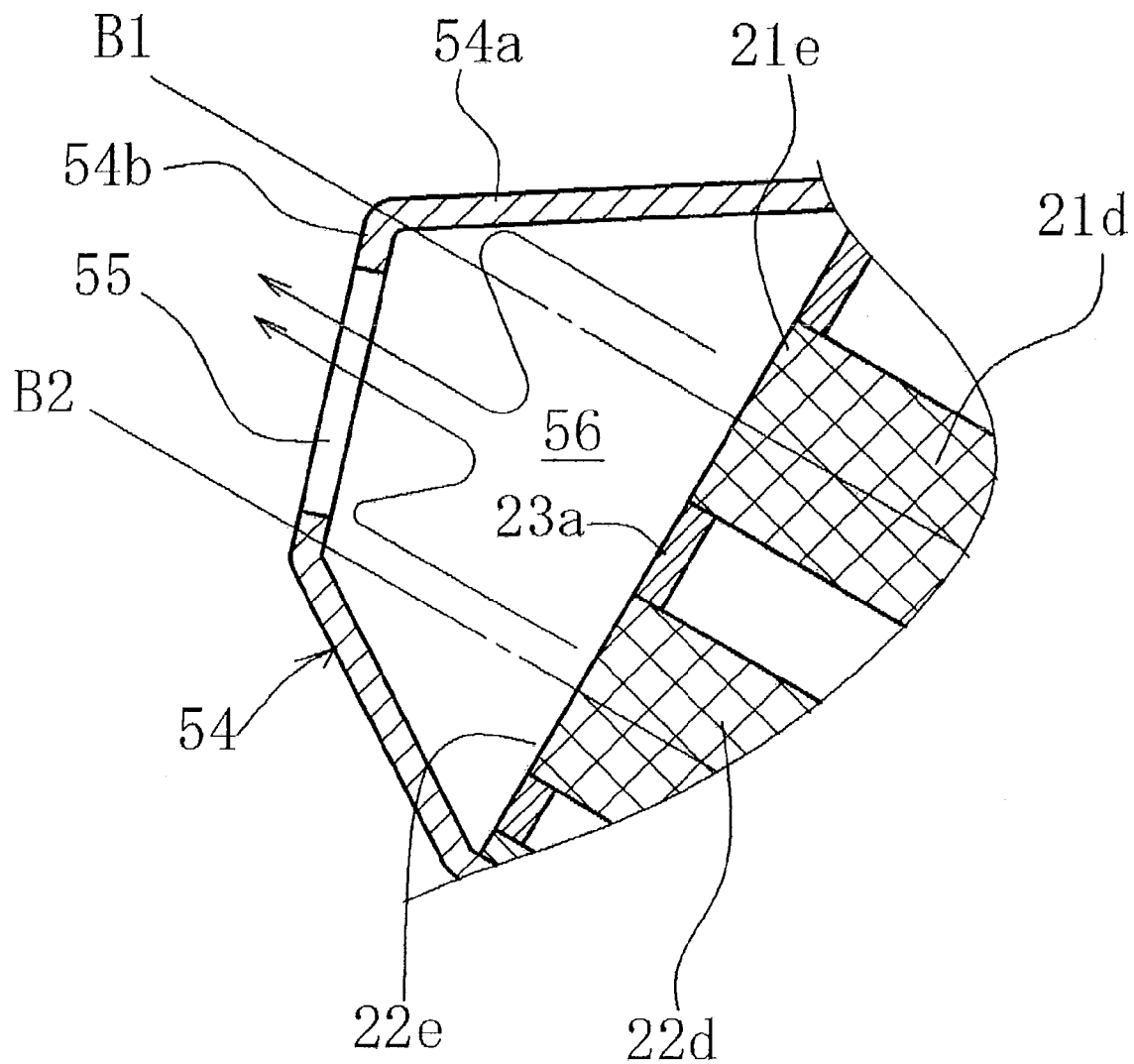
FIG. 7 is an enlarged cross-sectional view of an end cap portion in FIG. 5.
Figure 8:
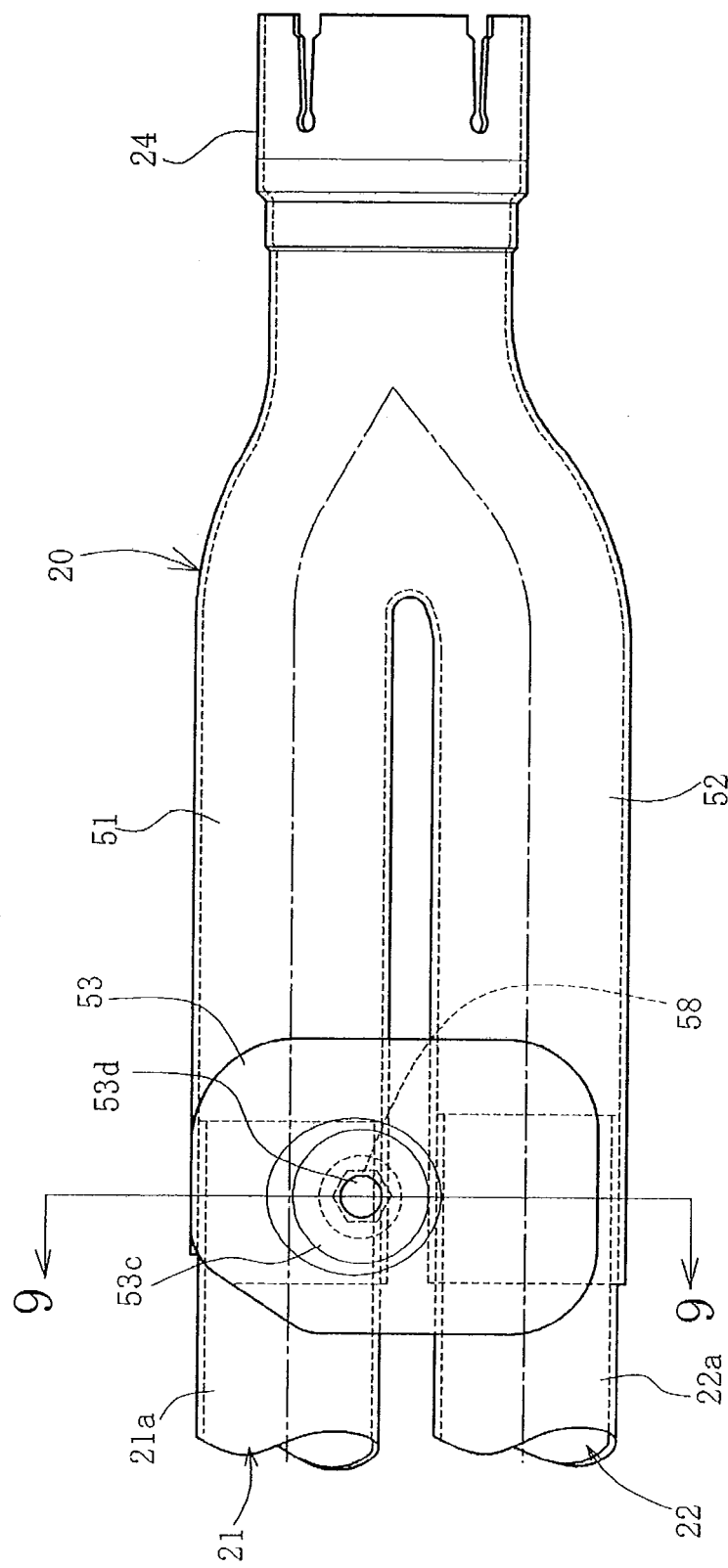
FIG. 8 is a lateral view of a branch joint portion.

FIG. 7 is an enlarged cross-sectional view of the inside of the end cap 54 in FIG. 5 for assistance in explaining the flow of exhaust gas coming out of the respective rear end openings 21e, 22e of the punching portions 21d, 22d.

The rear end of the muffler 23a is blocked by a partition wall 23a and covered by the end cap 54 from the rear thereof to define the expansion chamber 56 between the partition wall 23a and the end cap 54. In addition, the respective rear end openings 21e, 22e of the punching portions 21d, 22d are made to communicate with the inside of the expansion chamber 56.

The respective central axes B1 and B2 of the punching portions 21d and 22d are parallel to each other and are oriented above and below, respectively, the exhaust port 55 of the rear end face 54b. In this way, as indicated with arrows the exhaust gas coming out of the rear end openings 21e, 22e along the central axes B1, B2 toward the rearward hits and is reflected by the lateral surface 54a at positions offset from the exhaust port 55. The exhaust gas thus reflected expands toward the expansion chamber 56 and joins together the exhaust gas coming out of the punching portions 21d, 22d laterally and expanding in the expansion chamber 56. This reduces the sound pressure and then the exhaust gas is discharged outwardly from the exhaust port 55.

As described above, the rear end opening of the muffler 23 (the outer tube) is covered by the end cap 54 to define the inside of the end cap 54 as the expansion chamber 56. In addition, the respect rear end openings 21e, 22e of the punching portions 21d, 22d which are inner pipes communicate with the inside of the expansion chamber 56. Therefore, exhaust sound is reduced in the expansion chamber 56. This case requires only the provision of the exhaust port 55 in the end cap 54, so that exhaust gas can directly be discharged from the expansion chamber 56 through the exhaust port 55 but not via the conventional tail pipe. Therefore, the conventional tail pipe serving as a restrictor can be omitted, which makes satisfactory the escaping flow of exhaust gas toward the atmosphere.

The exhaust port 55 of the end cap 54 and the respective rear ends 21e and 22e of the punching portions 21d and 22d which are inner pipes are made offset upwardly and downwardly, respectively, from the exhaust port 55. Therefore, exhaust gas coming out of the respective rear ends 21e and 22e of the punching portions 21d and 22d is discharged after once hitting the lateral surface 54a and the rear end face 54b which are inside walls of the end cap 54. This reduces the fact that the exhaust gas coming out of the respective rear ends 21e and 22e of the punching portions 21d and 22d is directly discharged from the exhaust port 55 of the end cap 54. Therefore, the expansion chamber 56 can efficiently be utilized to enhance a sound-absorbing effect.

The vertically intermediate portion of the support plate 53 protrudes externally laterally to form a protruding portion 53c with a flat surface parallel to the vertical direction. The protruding portion 53c is provided with a through-hole 53d at its central portion and with a nut 58 concentrically to the through-hole 53d. The protruding portion 53c corresponds to the connecting portion of the present invention.

The nut 58 is located at a position offset externally laterally from a common tangential line D1 on the respective externally lateral surface sides of the branch pipes 51, 52. In addition, the nut 58 is located at a position slightly above an intermediate portion between the branch pipes 51 and 52 so that the extension of a fastening axial line F with the nut 58 intersects the lower portion of the branch pipe 51. A portion included in the protruding portion 53c and merging with a lower portion 53 serves as a bending portion 53d extending inwardly of the common tangential line D1, the bending portion 53d extending between the upper and lower branch pipes 51 and 52.

An inside support plate 59 is attached also to the inside lateral surface of the branch joint 20 to connect the branch pipes 51, 52 together. The support plate 59 has an upper portion 59a and a lower portion 59b which overlap the lateral surface lower portion of the branch pipe 51 and the lateral surface upper portion of the branch pipe 52, respectively, so as to slightly follow the corresponding outer circumferences thereof. In addition, the upper portion 59a and the lower portion 59b are welded to the branch pipes 51 and 52 at the upper end and the rear end, respectively. A vertical intermediate portion 59c is bent to extend into an intermediate portion between the branch pipe 51 and the branch pipe 52. Almost the whole of the support plate 59 including the intermediate portion 59c is located externally laterally of a common tangential line D2 on the respective inside surface sides of the branch pipes 51, 52. In addition, the upper portion 59a and the lower portion 59b each correspond to the bending portion of the invention. Further, the intermediate portion 59c corresponds to the connecting portion of the invention.

Figure 9:
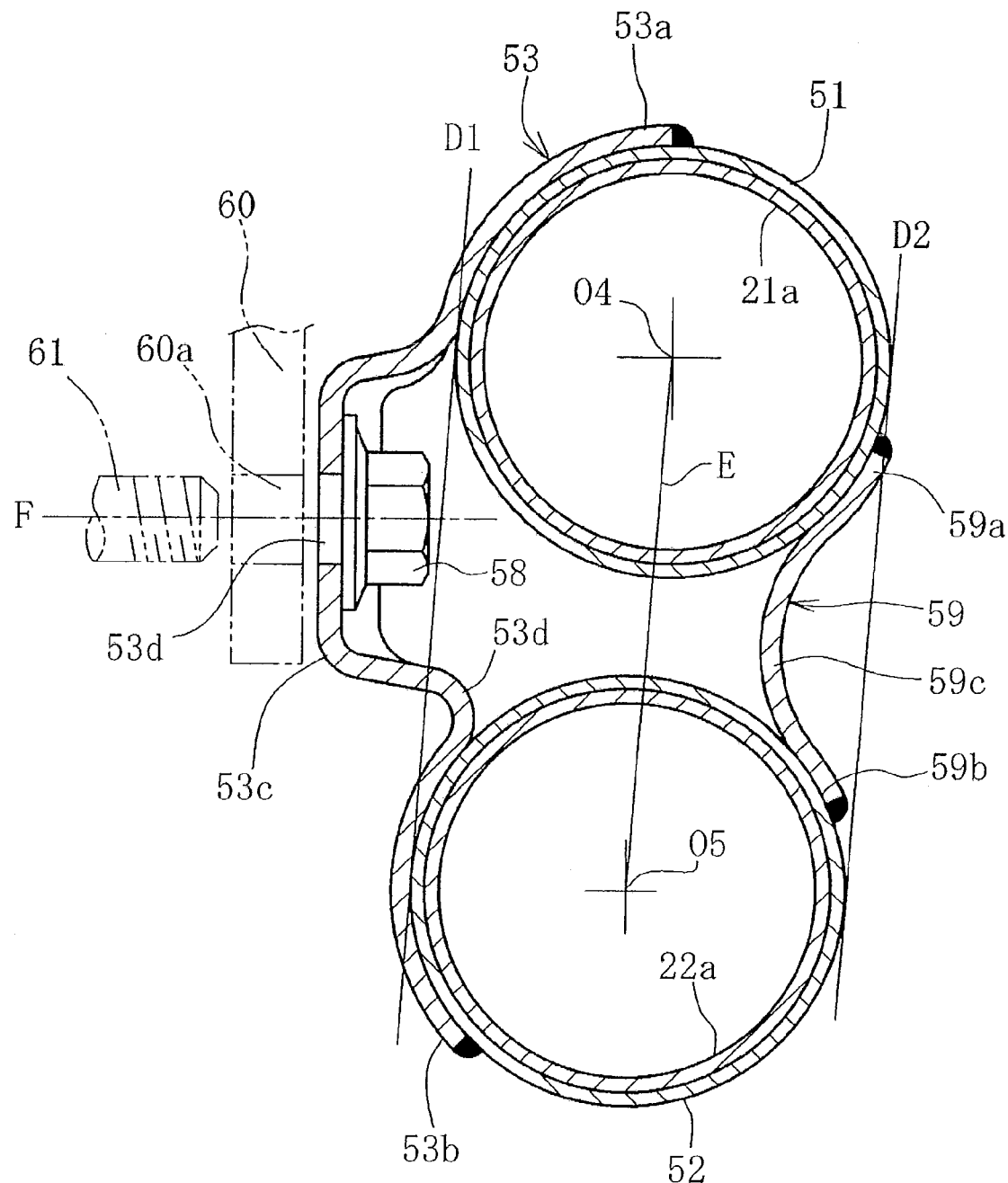
FIG. 9 is a cross-sectional view taken along line 9-9 in FIG. 8.

Symbols O4 and O5 in FIG. 9 denotes the respective centers of the front portions of the main body portions 21a, 22a included in the respective second exhaust pipes 21, 22. Symbol E denotes a straight line joining the centers O4 and O5. Symbol E denotes the straight line joining the centers O4 and O5 and extending parallel to each of the common tangential lines D1, D2. The straight line E is inclined so that its upper side is inclined toward the inward side of the vehicle body. Because of such an inclination, the front portions of the main body portions 21a, 22a of the second exhaust pipes can efficiently be disposed in the narrow space 45.

The protruding portion 53c overlaps the stay 60 (FIG. 4) which is formed on the inner surface of the pivot plate 6 so as to project inwardly, the branch joint 20 intersecting the pivot plate 6. A bolt 61 is passed through a through-hole 60a of the stay 60 from the external side of the vehicle body and is fastened to the nut 58, whereby the branch joint 20 can be supported by the pivot plate 6.

As described above, the interval between the second exhaust pipes 21, 22 is used to dispose the protruding portion 53c which is a connecting portion of the support plate 53, and the nut 58 is provided at the protruding portion 53c. The nut 58 is disposed between and close to the second exhaust pipes 21, 22, so that the protruding portion 53c is not made to protrude outwardly beyond necessity. The stay 60 is made to overlap the protruding portion 53c, which can bring the pivot plate 6 closer to the second exhaust pipes 21, 22, contributing to the slimming of the vehicle body.

The support plate 53 can be made to have multiple functions by being made to serve as the connection member for the second exhaust pipes 21, 22 and an attachment member to the pivot plate 6.

Figure 11:
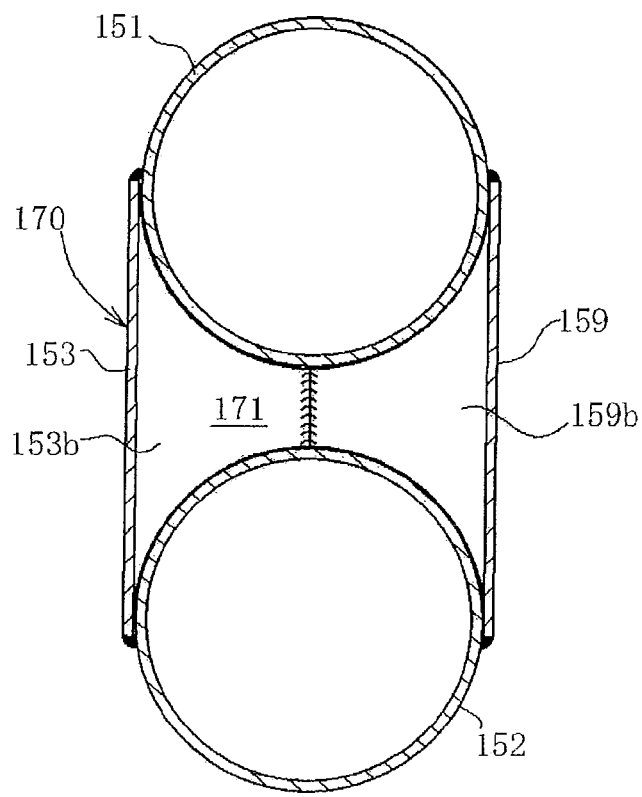
FIG. 11 is a cross-sectional view taken along line 11-11 in FIG. 10.
Figure 12:
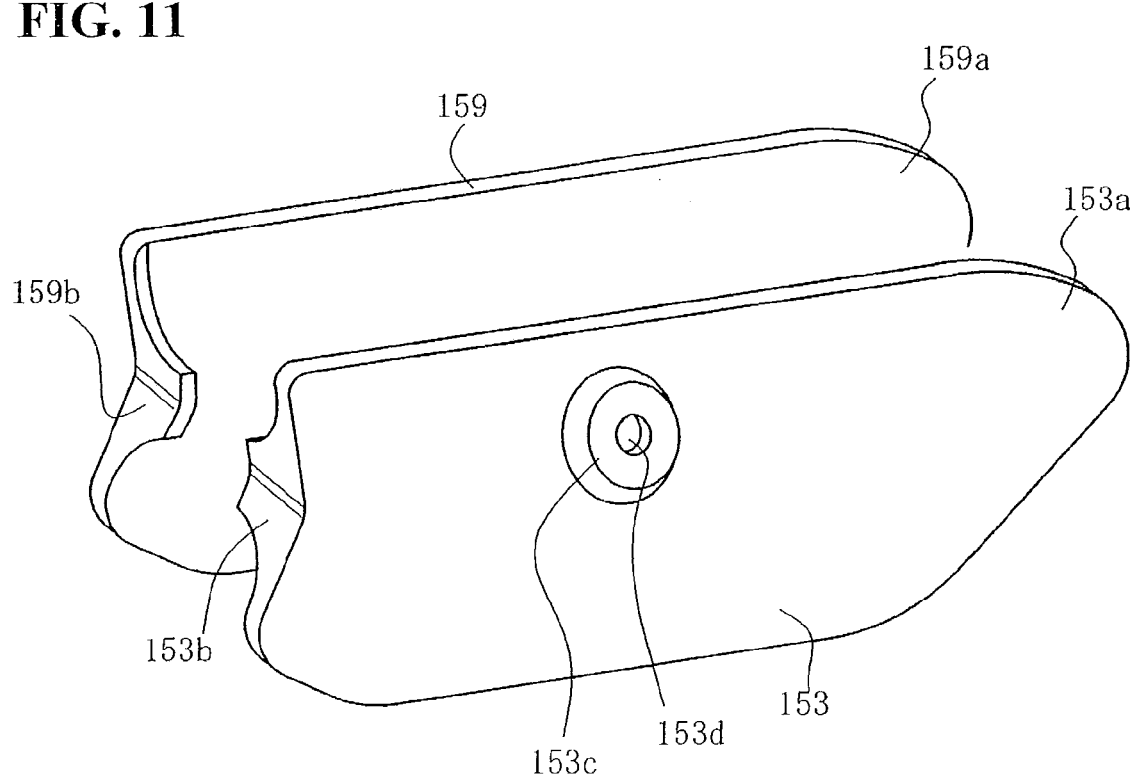
FIG. 12 is a perspective view of a connection plate according to another embodiment.
Figure 13:
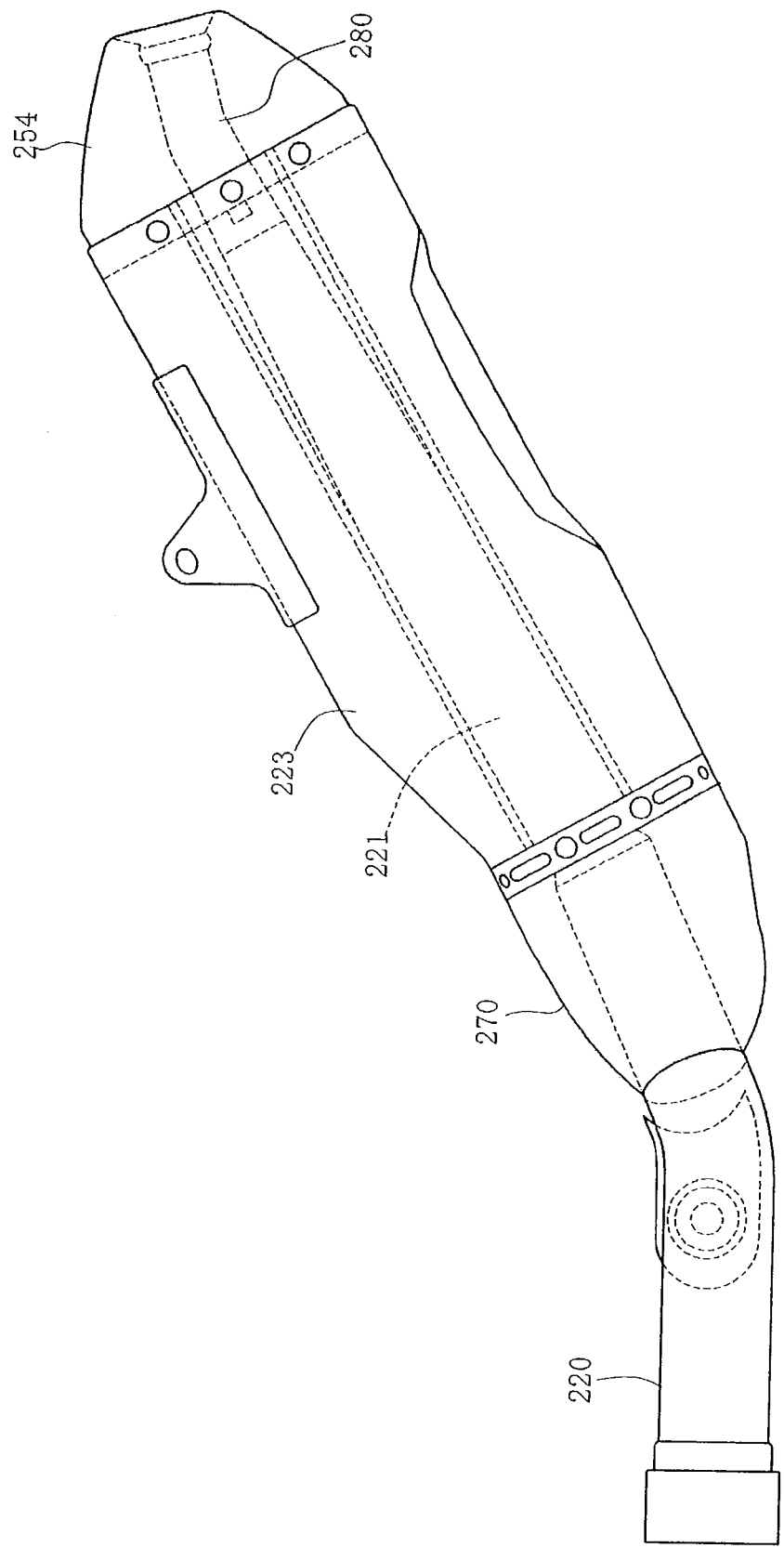
FIG. 13 is a lateral view of a rear portion of an exhaust system of a conventional example.

Another embodiment in which a resonator is installed at the branch portion is next described with reference to FIGS. 10 to 12.

Figure 10:
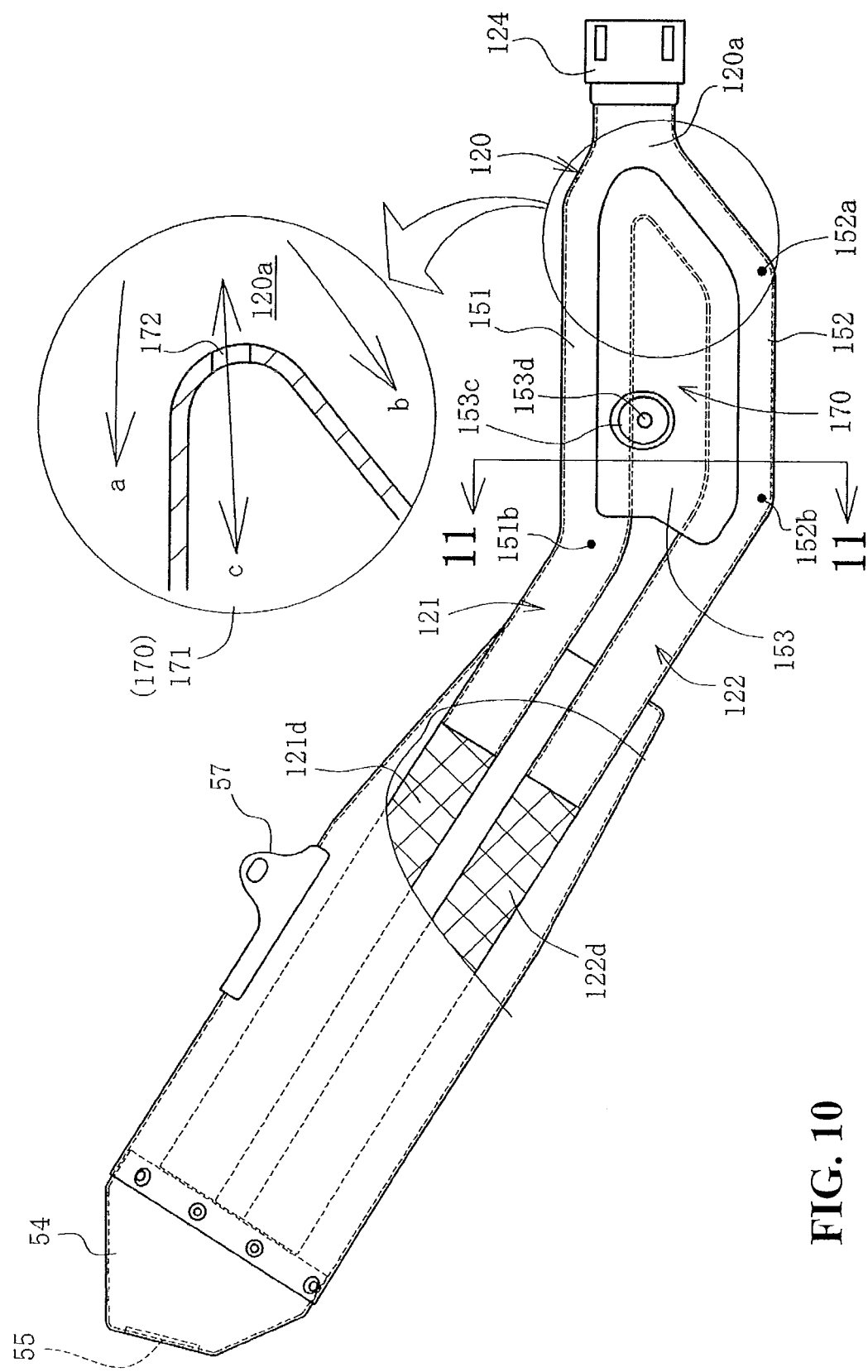
FIG. 10 is a lateral view of another embodiment corresponding to FIG. 8.

FIG. 10 is a partial broken-away lateral view of a portion corresponding to FIG. 5. FIG. 11 is a cross-sectional view taken along line 11-11 in FIG. 10. FIG. 12 is a perspective view of a connection plate used in this embodiment. In addition, since the present embodiment is mainly different from the previous embodiment only in the structure of the branch joint portion, an explanation of the points common to the present and previous embodiments is omitted.

Referring to FIG. 10, a rear portion of an exhaust system in this embodiment is provided with a pair of upper and lower second exhaust pipes 121, 122. Although the rear portions of the second exhaust pipes 121, 122 are omitted in FIG. 10, they extend into the muffler and serve as the inner pipes of the muffler similarly to the previous embodiment.

The front portions of the second exhaust pipes 121, 122 form a branch joint 120. A cylindrical connecting portion 124 is provided at the front end of the branch joint 120. The branch joint 120 is connected to the rear end of the exhaust pipe via the connecting portion 124.

The branch joint 120 is formed in a general Y-shape as viewed from the side in FIG. 10. The branch joint 120 is a hollow member integrally including a forwardly projecting connecting portion 124 and rearwardly bifurcating branch pipes 151, 152.

In addition, in this embodiment, the branch joint 120 is continuously-integrally formed as an assembling portion of the second exhaust pipes 121, 122. The branch pipes 151 and 152 serve as the corresponding front portions of second exhaust pipes 121 and 122, respectively, and also as the corresponding main body portions of the previous embodiment. However, similarly to the previous embodiment, the following may be acceptable. The branch joint 120 is formed separately from the second exhaust pipes 121, 122. The second exhaust pipes are each composed of a corresponding one of the branch pipes 151, 152 separately from each other and a corresponding one of main body portions fitted and joined to the respective rear end portions of the branch pipes 151, 152.

The branch pipe 151 extends rearwardly from the assembly portion 120a without bending so much. On the other hand, the branch pipe 152 largely bends obliquely downwardly and rearwardly from the assembling portion 120a. Thereafter, at a bending pipe 152a, the branch pipe 152 bends to extend straightly, i.e., extends rearward therefrom in parallel to the branch pipe 151. Further, at a bending pipe 152b, the branch pipe 152 bends to approach the branch pipe 151 and extends obliquely upwardly and rearwardly. In addition, also the branch pipe 151 extends obliquely upwardly and rearwardly at a bending pipe 151b located above the bending pipe 152b. Then, the upper and lower branch pipes 151, 152 are generally parallel to each other again.

In addition, the exhaust system rear portion rearward of the bending pipes 151b, 152b is configured similarly to the previous embodiment. The common portions are denoted with the corresponding reference numerals. The respective rear portions of the second exhaust pipes 121, 122 are provided with the punching portions 121d, 122d similarly to the previous embodiment. However, the punching portions 121d, 122d in the present embodiment have the same length and punching-start position.

Because of the large bending of the branch pipe 152, between the assembling portion 120a and the vicinities of the bending pipes 151b, 152b, the interval between the upper and lower branch pipes 151, 152 is largely broadened. The enlarged space provided between the branch pipes 151, 152 is used to install a resonator 170 therein.

More specifically, the upper and lower branch pipes 151, 152 are covered by a pair of support plates 153, 159 from the left and right. A space defined by the upper and lower branch pipes 151, 152 and the left and right support plates 153 and 159 is used as a resonator chamber 171 with a relatively large volume. This resonator chamber 171 is allowed to communicate with the inside of the assembling portion 120a via an opening 172, which constitutes the resonator 170.

The resonator 170 results from using Helmholtz resonance in which the resonator chamber 171 is allowed to serve as an expansion chamber communicating with the assembling portion 120a via an opening 172, thereby providing an resonance box. Exhaust gas entering the assembling portion 120a is split so as to flow into the upper and lower branch pipes 151, 152 as indicated with arrows "a" and "b." In addition, the exhaust gas partially goes in and out the resonator chamber 171 from the opening 172 as indicated with arrow "c," which causes Helmholtz resonance.

As described above, the support plates 153, 159 connecting the upper and lower branch pipes 151, 152 together are used to define the space surrounded by the upper and lower branch pipes 151, 152 and the left and right support plates 153, 159. This space is efficiently utilized to provide the resonator 170. The resonator 170 can reduce exhaust noise and vary output characteristics.

The support plates 153, 159 are each formed like a plate by press forming a flat plate. In addition, as illustrated in FIG. 12, the support plates 153, 159 are each formed to be elongated in the back and forth direction so as to conform to the shape of the resonator chamber 171. The support plates 153, 159 have respective head pipes 153a, 159a each formed like a general triangle where its front upper portion protrudes more forward so as to conform to the rear shape of the assembling portion 120a. Respective rear edge portions of the support plates 153, 159 are formed as sharply bending pipes 153b, 159b extending between the upper and lower branch pipes 151, 152. The leading end surfaces of the sharply bending pipes 153b, 159b are designed to come into contact with each other between the upper and lower branch pipes 151, 152. A protruding pipe 153c similar to the protruding pipe 53c in the previous embodiment is formed at the anteroposteriorly intermediate portion of the support plate 153. The protruding pipe 153c is formed with a through-hole 153d at its protruding top face.

The support plates 153, 159 are made to overlap the branch joint 120 from the left and right so that the upper and lower edge portions and head pipes 153a, 159a of the support plates 153, 159 are brought into contact with the corresponding lateral surfaces of the assembling portion 120a and of the branch pipes 151, 152. These members are united together by welding such contact portions. In this case, also the sharply bending portions 153b, 159b extend between the branch pipes 151, 152. Consequently, their upper and lower edge portions come into contact with the outer circumferential surfaces of the branch pipes 151, 152 and the leading edge portions come into contact with each other at their end faces. The contact portions are welded together to unite the left and right support plates 153, 159. In this way, the hermetically-closed resonator chamber 171 is formed among the upper and lower branch pipes 151, 152 and the left and right support plates 153, 159.

In addition, the present invention can be modified in various ways other than the embodiments described above. For example, if the number of the second exhaust pipes is two or more, it is not restrictive. For example, the number of the exhaust pipes may be four. In this case, the four second exhaust pipes can integrally be connected to one another by a single support plate.

Alternatively, two second exhaust pipes are arranged on each of the left and right of a vehicle body and connected to each of a pair of mufflers arranged on the left and right of the vehicle body, which constitutes the exhaust systems. These exhaust systems can each be configured as in the embodiments.

Further, if the exhaust system is provided on each of the left and right of the vehicle body, an engine is of a multi-cylinder type such as a two-cylinder or the like and the exhaust system mentioned above may be connected to each cylinder.

Furthermore, the resonator needs only to be installed by use of the branch portion. A resonator configured separately from the support plate can be installed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust device for a motorcycle including a head pipe supporting a front wheel via a front fork, a main frame extending obliquely rearwardly and downwardly from the head pipe, a pair of left and right pivot plates resulting from bending a rear portion of the main frame and extending downwardly, a swing arm swingably attached at a front end to the pivot plates and supporting a rear wheel at a rear end, an engine disposed in a space below the main frame, comprising:

an exhaust pipe having one end connected to an exhaust port of the engine and the other end side passing between a side of the engine and the main frame and extending rearwardly; and a muffler attached to an rear end of the exhaust pipe;

wherein the exhaust pipe intersects the main frame as viewed from a lateral side, branching at a branch joint into a plurality of portions at a position forward of an intersecting position, and includes:

a first exhaust pipe on an exhaust-upstream side of the branch joint, and a plurality of second exhaust pipes located on an exhaust-downstream side of the branch joint, each of the second exhaust pipes having a diameter smaller than that of the first exhaust pipe, wherein the second exhaust pipes are attached to one of the pivot plates via a support plate at a portion intersecting the one of the pivot plates, and the support plate connects the second exhaust pipes together.

2. The exhaust device for a motorcycle according to claim 1, wherein a shock absorber is installed between a rear portion of the main frame above the pivot plates and the swing arm and the plurality of second exhaust pipes arranged one above the other pass between the shock absorber and the main frame in a back and forth direction.

3. The exhaust device for a motorcycle according to claim 1, wherein the muffler includes an external tube and a plurality of inner pipes disposed in the external tube and respective ends of the second exhaust pipes are each connected to a corresponding one of the inner pipes.

4. The exhaust device for a motorcycle according to claim 2, wherein the muffler includes an external tube and a plurality of inner pipes disposed in the external tube and respective ends of the second exhaust pipes are each connected to a corresponding one of the inner pipes.

5. The exhaust device for a motorcycle according to claim 3, wherein the inner pipes communicate with a space in the external tube through punching in the external tube and the second exhaust pipes are different from each other in the length from the branch joint to a punching-start position.

6. The exhaust device for a motorcycle according to claim 3, wherein a rear end of the external tube of the muffler is blocked by a partition wall and is covered by an end cap from the rear, an expansion chamber is formed between the partition wall and the end cap, the inner pipes communicate at downstream ends with the inside of the expansion chamber, and the end cap is provided with an exhaust port adapted to allow the expansion chamber to communicate with the outside.

7. The exhaust device for a motorcycle according to claim 4, wherein a rear end of the external tube of the muffler is blocked by a partition wall and is covered by an end cap from the rear, an expansion chamber is formed between the partition wall and the end cap, the inner pipes communicate at downstream ends with the inside of the expansion chamber, and the end cap is provided with an exhaust port adapted to allow the expansion chamber to communicate with the outside.

8. The exhaust device for a motorcycle according to claim 6, wherein an exhaust port of the end cap and a downstream end opening of each of the inner pipes are arranged to be offset from an axial direction of each of the inner pipes.

9. The exhaust system for a motorcycle according to claim 1, wherein the support plate includes bending portions each bending along and welded to the outer circumference of each of the second exhaust pipes and a connecting portion connecting the bending portions together and at least partially extending between the second exhaust pipes adjacent to each other, and the support plate is bolted to the one of the pivot plates with a nut attached to the connecting portion.

10. The exhaust device for a motorcycle according to claim 1, wherein the support plate is a pair of flat support plates which straddle and are secured to the second exhaust pipes from the left and right to define a resonator chamber between the second exhaust pipes.

11. The exhaust device for a motorcycle according to claim 2, wherein the support plate is a pair of flat support plates which straddle and are secured to the second exhaust pipes from the left and right to define a resonator chamber between the second exhaust pipes.

12. The exhaust device for a motorcycle according to claim 3, wherein the support plate is a pair of flat support plates which straddle and are secured to the second exhaust pipes from the left and right to define a resonator chamber between the second exhaust pipes.

13. The exhaust device for a motorcycle according to claim 5, wherein the support plate is a pair of flat support plates which straddle and are secured to the second exhaust pipes from the left and right to define a resonator chamber between the second exhaust pipes.

14. An exhaust device adapted to be used with a motorcycle including main frame comprising:
an exhaust pipe having one end adapted to be connected to an exhaust port of an engine and an opposite end side passing between a side of the engine and the main frame and extending rearwardly; and
a muffler attached to an rear end of the exhaust pipe;
wherein the exhaust pipe intersects the main frame as viewed from a lateral side, branching into a plurality of portions at a position forward of an intersecting position, and includes:
a first exhaust pipe on an exhaust-upstream side of a branch joint, and
a plurality of second exhaust pipes located on an exhaust-downstream side of the branch joint,
each of the second exhaust pipes having a diameter smaller than that of the first exhaust pipe,
wherein a shock absorber is installed between a rear portion of the main frame above a pivot plate and a swing arm and the plurality of second exhaust pipes arranged one above the other pass between the shock absorber and the main frame in a back and forth direction.

15. The exhaust device adapted to be used with a motorcycle according to claim 14, wherein the second exhaust pipes are attached to the pivot plate via a support plate at a portion intersecting the pivot plate, and the support plate connects the second exhaust pipes together.

16. The exhaust device for a motorcycle according to claim 14, wherein a pair of flat support plates straddle and are secured to the second exhaust pipes from the left and right to define a resonator chamber between the second exhaust pipes.

17. An exhaust device adapted to be used with a motorcycle including a main frame comprising:
an exhaust pipe having one end adapted to be connected to an exhaust port of an engine and an opposite end side passing between a side of the engine and the main frame and extending rearwardly; and
a muffler attached to a rear end of the exhaust pipe;
wherein the exhaust pipe intersects the main frame as viewed from a lateral side, branching into a plurality of portions at a position forward of an intersecting position, and includes:
a first exhaust pipe on an exhaust-upstream side of a branch joint, and
a plurality of second exhaust pipes located on an exhaust-downstream side of the branch joint,
each of the second exhaust pipes having a diameter smaller than that of the first exhaust pipe,
wherein the muffler includes an external tube and a plurality of inner pipes disposed in the external tube and respective ends of the second exhaust pipes are each connected to a corresponding one of the inner pipes.

18. The exhaust device for a motorcycle according to claim 17, wherein a pair of flat support plates straddle and are secured to the second exhaust pipes from the left and right to define a resonator chamber between the second exhaust pipes.

19. The exhaust device adapted to be used with a motorcycle according to claim 17, wherein the second exhaust pipes are attached to a pivot plate via a support plate at a portion intersecting the pivot plate, and the support plate connects the second exhaust pipes together.

\* \* \* \* \*